United States Patent
Sato

(10) Patent No.: US 10,705,601 B2
(45) Date of Patent: Jul. 7, 2020

(54) INFORMATION PROCESSING DEVICE, INTEREST EVALUATION METHOD, AND NON-TRANSITORY COMPUTER-READABLE STORAGE MEDIUM

(71) Applicant: FUJITSU LIMITED, Kawasaki-shi, Kanagawa (JP)

(72) Inventor: Teruyuki Sato, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 15/590,561

(22) Filed: May 9, 2017

(65) Prior Publication Data
US 2017/0336866 A1    Nov. 23, 2017

(30) Foreign Application Priority Data

May 17, 2016    (JP) ................................. 2016-098954

(51) Int. Cl.
G06F 3/048   (2013.01)
G06F 3/01    (2006.01)
G06F 3/0485  (2013.01)
G06F 3/0484  (2013.01)
G06F 3/0488  (2013.01)

(52) U.S. Cl.
CPC ............ G06F 3/013 (2013.01); G06F 3/0485 (2013.01); G06F 3/04845 (2013.01); G06F 3/04883 (2013.01); G06F 2203/04806 (2013.01)

(58) Field of Classification Search
CPC ............. G06F 3/04845; G06F 3/04883; G06F 3/0485; G06F 3/04806; G06F 3/013
See application file for complete search history.

(56) References Cited

U.S. PATENT DOCUMENTS

| | | | |
|---|---|---|---|
| 2005/0114142 A1 | 5/2005 | Asukai et al. | |
| 2005/0137825 A1 | 6/2005 | Sako et al. | |
| 2006/0174213 A1* | 8/2006 | Kato | G01C 21/367 715/800 |
| 2007/0223047 A1* | 9/2007 | Kameyama | H04N 1/3875 358/302 |
| 2012/0240079 A1* | 9/2012 | Takami | G06F 3/0488 715/784 |

(Continued)

FOREIGN PATENT DOCUMENTS

| | | |
|---|---|---|
| JP | 2000-99526 | 4/2000 |
| JP | 2005-152054 | 6/2005 |

(Continued)

OTHER PUBLICATIONS

Japanese Office Action dated Feb. 4, 2020 for corresponding Japanese Patent Application No. 2016-098954, with English Translation, 13 pages.

*Primary Examiner* — Anil N Kumar

(74) *Attorney, Agent, or Firm* — Fujitsu Patent Center

(57) ABSTRACT

An information processing device including a memory and a processor coupled to the memory and the processor configured to detect an enlargement ratio of a content displayed on a screen based on an angle-of-view enlarging action performed on the content, calculate a scroll speed of the content, evaluate the degree of interest corresponding to the content based on the enlargement ratio and the scroll speed, and perform a display processing for the screen in accordance with display configuration determined based on the evaluated degree of interest.

14 Claims, 10 Drawing Sheets

(56) References Cited

U.S. PATENT DOCUMENTS

2012/0278742 A1 11/2012 Takami
2013/0232005 A1 9/2013 Torii
2016/0232561 A1* 8/2016 Kikuchi, II .............. A61B 5/16

FOREIGN PATENT DOCUMENTS

| JP | 2005-173931 | 6/2005 |
| JP | 2005-339368 | 12/2005 |
| JP | 2007-121179 | 5/2007 |
| JP | 2009-245185 A | 10/2009 |
| JP | 2010-237942 | 10/2010 |
| JP | 2011-113280 | 6/2011 |
| JP | 2012-103816 A | 5/2012 |
| JP | 2014-48888 A | 3/2014 |
| JP | 2015-191551 A | 11/2015 |

* cited by examiner

FIG. 5A
FIG. 5B
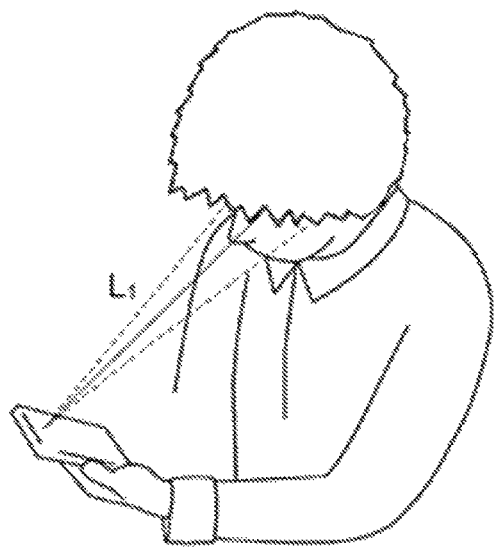
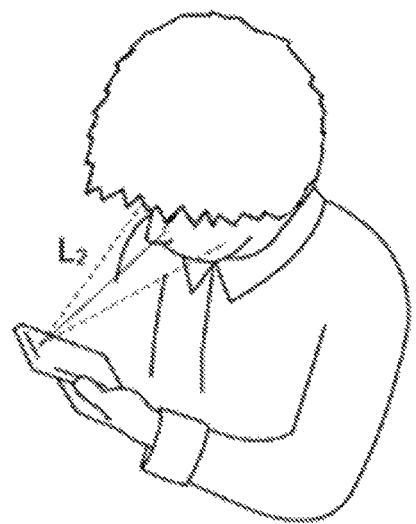
FIG. 5C
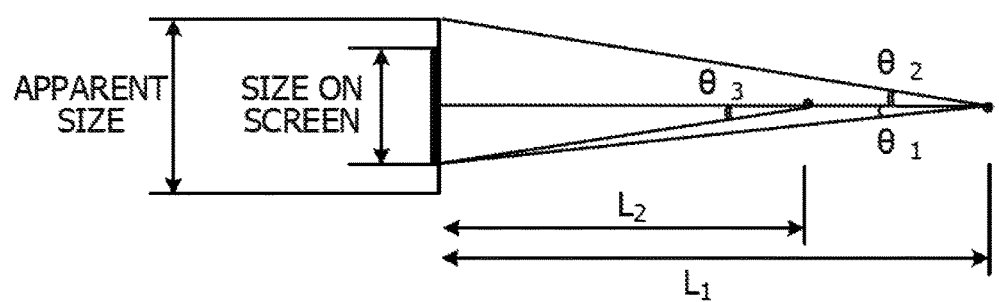

INFORMATION PROCESSING DEVICE, INTEREST EVALUATION METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-098954, filed on May 17, 2016, the entire contents of which are incorporated herein by reference.

FIELD

The embodiments discussed herein are related to an information processing device, an interest evaluation method, and non-transitory computer-readable storage medium.

BACKGROUND

In the past, there have been proposed various methods for evaluating the degree of interest or the interest level of a user in contents in an information processing system that distributes the contents to the user via a network. In other words, preferences of the user and information in which the user is interested are estimated and evaluated based on what the contents browsed by the user indicate. These pieces of information are utilized in, for example, an information distribution service for introducing information and product advertisements that each have a high value for each of users.

In addition, there is known a technology for estimating one of contents, in which a user is interested, in a case where the contents are contained by a single Web page. In a case where an operation for causing a portion of a content to be enlarged and to be displayed within, for example, a Web page, is performed, it may be determined that information of an area subjected to the enlarged display generates a user's interest. By using such an estimation method, it becomes possible to estimate points within a content, in which a user becomes interested (see, for example, Japanese Laid-open Patent Publication No. 2010-237942).

SUMMARY

According to an aspect of the invention, an information processing device including a memory and a processor coupled to the memory and the processor configured to detect an enlargement ratio of a content displayed on a screen based on an angle-of-view enlarging action performed on the content, calculate a scroll speed of the content, evaluate the degree of interest corresponding to the content based on the enlargement ratio and the scroll speed, and perform a display processing for the screen in accordance with display configuration determined based on the evaluated degree of interest.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A to 5C are diagrams for explaining a viewing distance;

DESCRIPTION OF EMBODIMENTS

Figure 1:
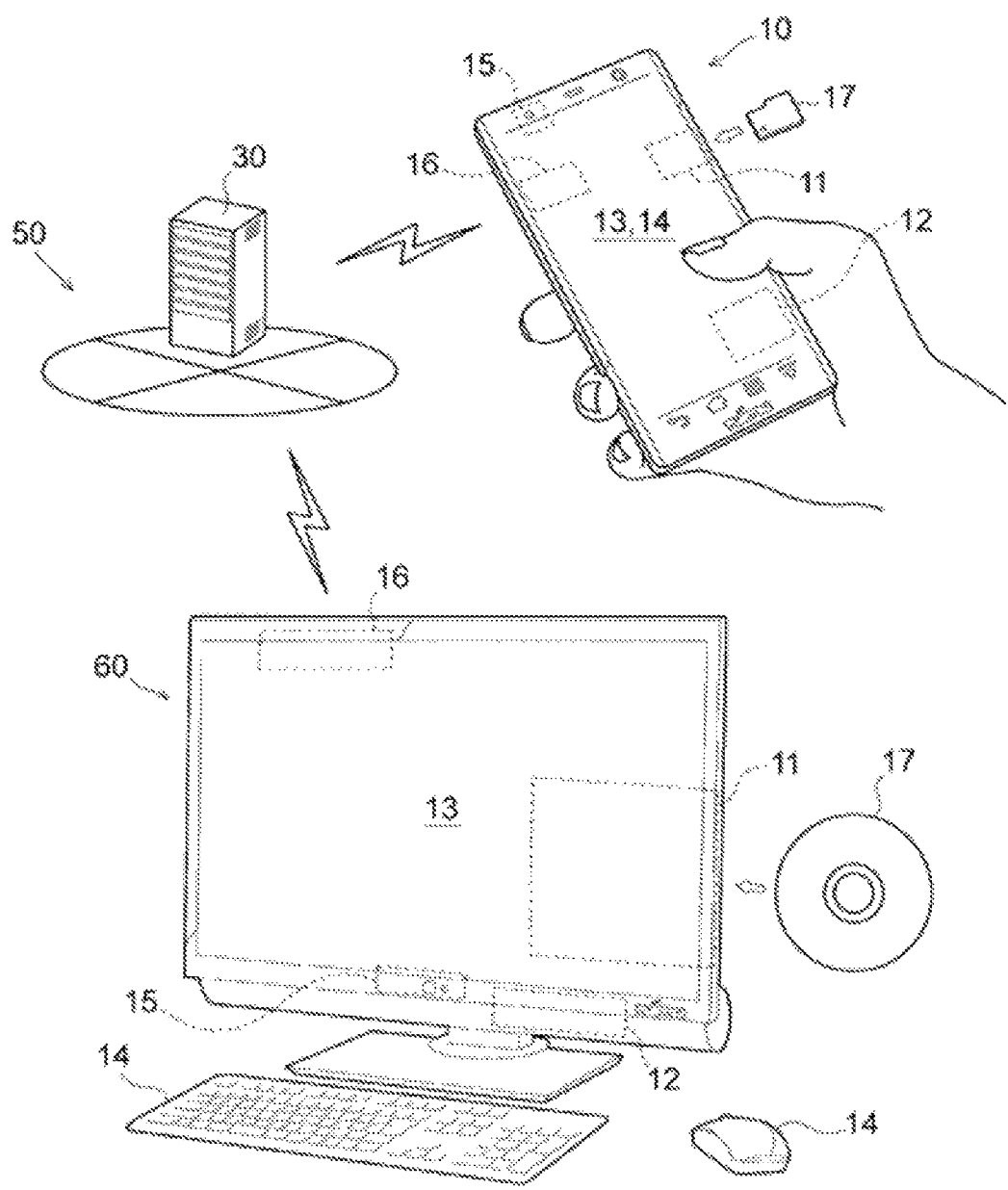
FIG. 1 is a diagram exemplifying an information processing device.

By referencing an operation of a user, it is possible to roughly estimate preferences of the user or the presence or absence of the user's interest. However, it is hard to accurately understand the intensity of the interest or the level thereof. In a case where a user finishes reading an article within, for example, a Web page, it is difficult to evaluate the final extent of the user's interest in the entire article, by using an objective measure. In addition, even if it is possible to identify a point that generates the user's interest within a content, it is difficult to evaluate, in an objective way, the extent of the intensity level of the interest.

In one aspect, an object is to improve the evaluation accuracy of the degree of interest.

An information processing device, a degree-of-interest evaluation method, and a degree-of-interest evaluation program serving as embodiments will be described with reference to drawings. In this regard, however, the embodiments illustrated below are just exemplifications, and there is no intention to exclude various modifications thereto and various applications of the technology, not illustrated in the embodiments. In other words, the present embodiments may be variously modified (by, for example, a combination of an embodiment and an example of a modification) and be implemented without departing from the scope thereof.

1. Outline of Evaluation Method

The information processing device, the degree-of-interest evaluation method, and the degree-of-interest evaluation program of the present embodiment each include a function of quantifying and understanding the degree A of interest of a user in a content displayed on a screen. The term "screen" here means a display screen on which visual information is output, and examples thereof include display screens of a smartphone, a tablet, a personal data assistant (PDA), a personal computer, a television, and so forth.

The term "content" means visual information displayed on a screen or the content thereof. While the degree A of interest in a content may be evaluated for one content by using a single value, it is desirable that the degree A of interest in a content is understood as being changed in response to a position within the content or a browsing time period of the content. In other words, the degree A of interest is expressed by a function of a position within the content or a browsing time period of the content, and the form of the function is considered as different for each content.

In this way, a model based on the assumption that the degree A of interest may be changed in a process in which the user reads further in a content is used. Accordingly, it becomes easy to understand a temporal change in the degree A of interest, and the temporal resolution of the degree A of interest is improved. In addition, before the user finishes browsing an entire content, it becomes possible to understand the tendency of a change in the degree A of interest in that content, for example. Therefore, a time period taken to evaluate the degree A of interest is reduced, and a time period before the degree A of interest is utilized is shortened.

Based on an angle-of-view enlarging action dynamically performed by the user, the degree A of interest is non-invasively and simply understood. The term "angle-of-view enlarging action" here includes an operation (zoom operation) to cause a content displayed on the screen to be subjected to enlarged display and an operation to increase a visual angle of the content (or a viewing angle of the screen) for the user. The former operation is an operation for increasing the display size of the content on the screen, and a pinch-out operation, a double-tap operation, and so forth are included therein, for example. In addition, a rotation operation for changing the screen of a smartphone from a longitudinally long state (longitudinally holding attitude) to a horizontally long state (horizontally holding attitude), a tap or click operation for an enlargement button, a mouse gesture operation corresponding to an enlargement instruction for a display size, and so forth are included therein. The latter operation is an operation for decreasing a viewing distance of the user for the screen, and operations for getting closer to the screen (an operation for putting a face closer to the screen and an operation for putting the screen closer to the face) are included therein.

The degree A of interest of the user is quantitatively evaluated based on an enlargement ratio E of the content and a scroll speed Vs. The enlargement ratio E is specified based on the angle-of-view enlarging action. In, for example, a case where the zoom operation for the content is performed, the ratio of an enlarged size (in other words, a value obtained by dividing the enlarged size by a standard size of the content) is detected (or calculated) as the enlargement ratio E, based on the standard size of the content. Since the size of the content on the screen is actually enlarged, this enlargement ratio E may be called an absolute enlargement ratio $E_{AB}$.

In addition, in a case where the operation for decreasing the viewing distance is performed, the ratio of a visual angle after getting closer (in other words, a value obtained by dividing the visual angle after getting closer, by a standard visual angle of the content) or a change ratio of an apparent size between before and after getting closer is detected (or calculated) as the enlargement ratio E, based on the standard visual angle. This enlargement ratio E is the enlargement ratio E with which the content appears to be enlarged based not on enlargement of the content on the screen but on a relative distance between the screen and the user, and the enlargement ratio E may be called a relative enlargement ratio $E_{RE}$. In a case where the zoom operation for the content and the operation for decreasing the viewing distance are simultaneously performed, the product of a value (the enlargement ratio $E_{AB}$ of an absolute size) based on the former and a value (the enlargement ratio $E_{RE}$ of a relative size) based on the latter becomes the total enlargement ratio E (the actual enlargement ratio E).

The scroll speed Vs is a movement speed of the content within the screen, the content being displayed on the screen, and the scroll speed Vs is specified based on a scroll operation actively performed by the user, for example. The term "scroll operation" here includes a flick operation (slide operation) on a touch panel, a rotation operation for a mouse wheel, a drag operation performed on a scroll bar displayed on the screen, a press-down operation performed on an arrow key, a page up key, or a page down key of a keyboard, and so forth. In addition, the scroll speed Vs may be estimated based on a motion of a visual line (a silent reading rate, a visual line gesture operation, or the like) in place of the scroll operation. A viewpoint position or the behavior thereof is measured from, for example, a visible-light image-captured image, an infrared-ray image-captured image, or the like, image-captured by a video camera, by using a known method such as an estimation method based on a corneal reflection method or an iris position or an estimation method based on the flatness of a pupil. Accordingly, the motion of the visual line may be estimated.

It is estimated that the value of the degree A of interest increases with an increase in the enlargement ratio E of the content (the user reads intensively or looks carefully at the content). In addition, it is estimated that the degree A of interest decreases with an increase in the scroll speed Vs of the content (the user skims therethrough or skips thereover). However, by enlarging the content, a content amount (the number of images, the number of characters, or the like) included within one screen (or one line) is decreased, and the frequency of the scroll operation or the speed thereof may be increased. In other words, in a case where the influence of the enlargement ratio E on the value of the degree A of interest and the influence of the scroll speed Vs on the value of the degree A of interest are equally evaluated, an increase in the degree A of interest, based on an enlargement operation, may be cancelled out by an increase in the scroll speed Vs. Therefore, a relationship between the three of the degree A of interest, the enlargement ratio E, and the scroll speed Vs is set so that the influence of the enlargement ratio E on the degree A of interest becomes stronger than the influence of the scroll speed Vs on the degree A of interest.

In the present embodiment, a weight coefficient W is set as a parameter corresponding to the enlargement ratio E, and based on this weight coefficient W and the scroll speed Vs, the degree A of interest is calculated and evaluated. The value of the degree A of interest may be calculated as a value (W/Vs) obtained by dividing the weight coefficient W by the scroll speed Vs, for example. Alternatively, based on a time when the user starts reading an article, the value (W/Vs) obtained by dividing the weight coefficient W by the scroll speed Vs is integrated, and the integration value thereof may be defined as the value of the degree A of interest at a position within the content at that point of time.

The weight coefficient W is defined as a parameter having a value that increases with an increase in the enlargement ratio E. In addition, a relationship between the weight coefficient W and the enlargement ratio E is defined as a relationship in which a graph shape obtained by assigning the enlargement ratio E to a horizontal axis and by assigning the weight coefficient W to a vertical axis is convex downward. A relationship between the enlargement ratio E and the weight coefficient W is set so that in a case where the value of the enlargement ratio E is doubled, the value of the weight coefficient W becomes more than doubled, for example. It is desirable that a relationship in which the increase gradient of the weight coefficient W with respect to the enlargement ratio E increases with an increase in the enlargement ratio E is adopted. Alternatively, it is assumed that the weight coefficient W is given by a function including an exponent with the enlargement ratio E as a base (a mathematical expression including an exponent in which the enlargement ratio E serves as a base and in which a power index r is set to a value greater than "1"). By setting such a relationship as described above, the weight coefficient W is strongly reflected in the value of the degree A of interest, compared with the scroll speed Vs inversely proportional to the enlargement ratio E.

The value of the degree A of interest, quantified by the above-mentioned method, is utilized for changing what a content provided to the user indicates or the display form thereof. Articles or the like within electronic mails, network news, and Web pages are defined as targets, for example, and the degree A of interest in each of the articles is understood along with a temporal change therein. In addition, based on the degrees A of interest, selection of sorting (rearrangement), display, or non-display of articles is implemented. Alternatively, the content of an advertisement column, displayed outside the field of an article, is dynamically changed in response to the degree A of interest (or the integration value thereof). In this case, the content of a point that indicates the highest degree A of interest within the article may be analyzed, thereby presenting an advertisement suitable for the content thereof.

2. Hardware

FIG. 1 is a perspective view illustrating a client (a smartphone 10 or a computer 60) and a server 30 that are each able to function as an information processing device. Each of the smartphone 10 and the computer 60 is installed so as to be able to perform communication with the server 30 on the Internet 50 by using wire or wireless communication. An evaluation target of the degree A of interest is a user of the smartphone 10 or computer 60. A degree-of-interest evaluation program 1 used for evaluating the degree A of interest of the user may be executed by each of the smartphone 10, the server 30, and the computer 60, for example, or may be executed by the smartphone 10, the server 30, and the computer 60 in conjunction with one another. Hereinafter, a case where the degree-of-interest evaluation program 1 is mainly executed by the smartphone 10 will be described.

Figure 2:
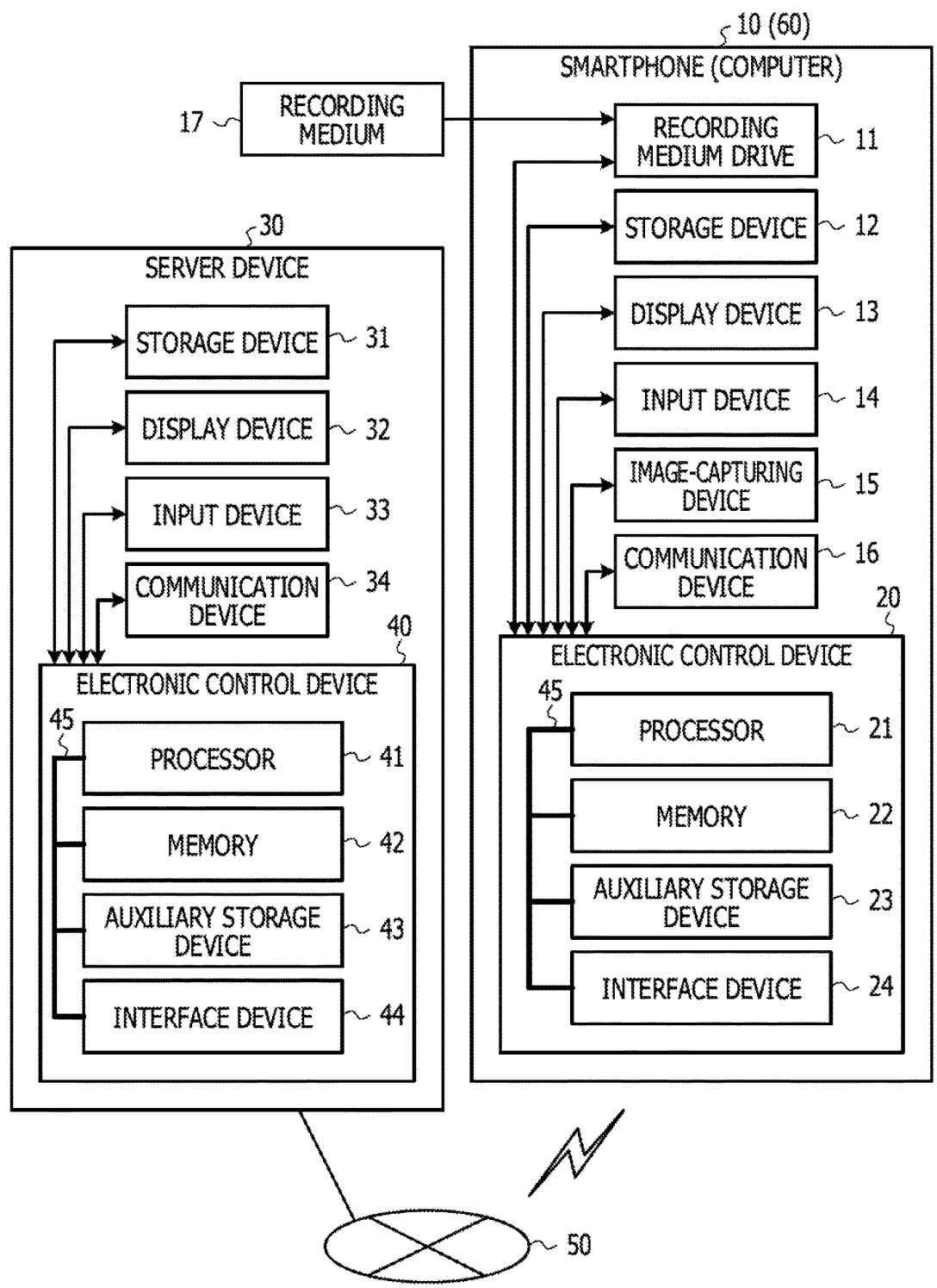
FIG. 2 is a diagram exemplifying a hardware configuration of the information processing device.

FIG. 2 is a diagram illustrating an example of a hardware configuration of each of the smartphone 10 and the server 30. In the smartphone 10, a recording medium drive 11 for reading a program recorded in a recording medium 17, a storage device 12, a display device 13, an input device 14, an image-capturing device 15, a communication device 16, and an electronic control device 20 are installed. Note that a hardware configuration of the computer 60 is the same as that of the smartphone 10. The electronic control device 20 executes the degree-of-interest evaluation program 1, thereby functioning as the information processing device for evaluating the degree A of interest of a user.

The recording medium 17 (a removable medium) is a flash memory card, a semiconductor memory device compliant with a universal serial bus standard, an optical disk, or the like, for example. The recording medium drive 11 is a reading device to read information (a program or data) recorded and saved in the recording medium 17. The storage device 12 is a memory device in which data and a program to be held on a long-term basis are stored, and examples thereof include nonvolatile memories such as a flash memory, an electrically erasable programmable read-only memory (EEPROM), and a solid state drive.

The display device 13 is one of devices for visually outputting a processing result of the electronic control device 20 and is a liquid crystal display (LCD) or an organic electro-luminescence display (OELD), for example. The display device 13 is able to outputs contents such as articles within electronic mails, network news, and Web pages, browsed by the user. In addition, an evaluation result in the degree-of-interest evaluation program 1 is able to be output.

The input device 14 is one of pointing devices for inputting a signal to be input to the electronic control device 20. The input device 14 in the smartphone 10 illustrated in FIG. 1 is a touch panel attached to the surface of the display device 13 in a superposition state. In a case of causing the computer 60 to function as the information processing device, a keyboard or a mouse is used as the input device 14. In addition, in a case where physical keys are installed in the smartphone 10, that physical keys may be used as the input device 14. The input device 14 is one of units for detecting a zoom operation or a scroll operation, performed on a content.

The image-capturing device 15 is an imaging device for image-capturing an image (or a moving image) of the user who browses a content, and the image-capturing device 15 is arranged in the vicinity of the display device 13 to the extent that the user's view is not hindered. A position of the image-capturing device 15, relative to the display device 13, is fixed. Accordingly, by measuring the face width (or a distance between right and left eyeballs or a distance between right and left irises) within a screen image-captured by the image-capturing device 15, it is possible to estimate a distance (viewing distance) from the user to the display device 13. Image data image-captured here is transmitted to the electronic control device 20. The image-capturing device 15 is one of units for detecting an operation performed for getting closer to a screen by the user. Note that the operation performed for getting closer by the user may be detected based not only on an image image-captured by the image-capturing device 15 embedded in the smartphone 10 or the computer 60 but also on an image of a camera separately installed.

The communication device 16 is a device to control communication with the outside of the smartphone 10 and performs communication with the server 30 via, for example, a wireless communication network. In addition, in a case where input-output devices compliant with a short distance wireless communication standard are coupled to the smartphone 10, these input-output devices are coupled via the communication device 16. Contents displayed in the display device 13 (contents provided to the user) include pieces of information such as videos, images, pictograms, and texts, transmitted to the smartphone 10 via the communication device 16 by the server 30. In addition, the above-mentioned contents include not only information acquired online but also offline information stored within the smartphone 10.

A processor 21 (a central processing unit), a memory 22 (a main memory or a main storage device), an auxiliary storage device 23, an interface device 24, and so forth are embedded in the electronic control device 20 and are coupled so as to be able to perform communication with one another. The processor 21 is a central processing unit in which a control unit (a control circuit), a computing unit (a computing circuit), a cache memory (a register group), and so forth are embedded. In addition, the memory 22 is a storage device in which a program or currently processed data is stored, and examples thereof include a read only memory (ROM) and a random access memory (RAM).

The auxiliary storage device 23 is a memory device in which data and firmware to be held, compared with the memory 22, on a long-term basis are stored, and examples thereof include nonvolatile memories such as a flash memory and an EEPROM. In addition, the interface device 24 is a device to control input and output (I/O) between the electronic control device 20 and the outside thereof. The electronic control device 20 is coupled, via the interface device 24, to the recording medium drive 11, the storage device 12, the display device 13, the input device 14, the image-capturing device 15, the communication device 16, and so forth.

The degree-of-interest evaluation program 1 executed by the electronic control device 20 may be recorded and saved within, for example, the storage device 12 in the smartphone 10 or may be recorded and saved within the auxiliary storage device 23 or the memory 22. Alternatively, a program may be recorded and saved on the recording medium 17, and the degree-of-interest evaluation program 1 written into that recording medium 17 may be read via the recording medium drive 11 by the electronic control device 20. At a time of executing the degree-of-interest evaluation program 1, the content of the program is deployed within a memory space and is executed by the processor 21.

A storage device 31, a display device 32, an input device 33, a communication device 34, and an electronic control device 40 are embedded in the server 30. A function of each of the elements is roughly the same as that of an element that has the same name and that is embedded in the smartphone 10. On the other hand, information of contents to be distributed to a smartphone 10 side is recorded and saved in the storage device 31 in the server 30, and the electronic control device 40 has a function of distributing these contents. In addition, the electronic control device 40 has a function of transmitting, to each of clients, information for changing, in accordance with the degree A of interest of a user, what a contents indicates or the display form thereof.

3. Software

Figure 3:
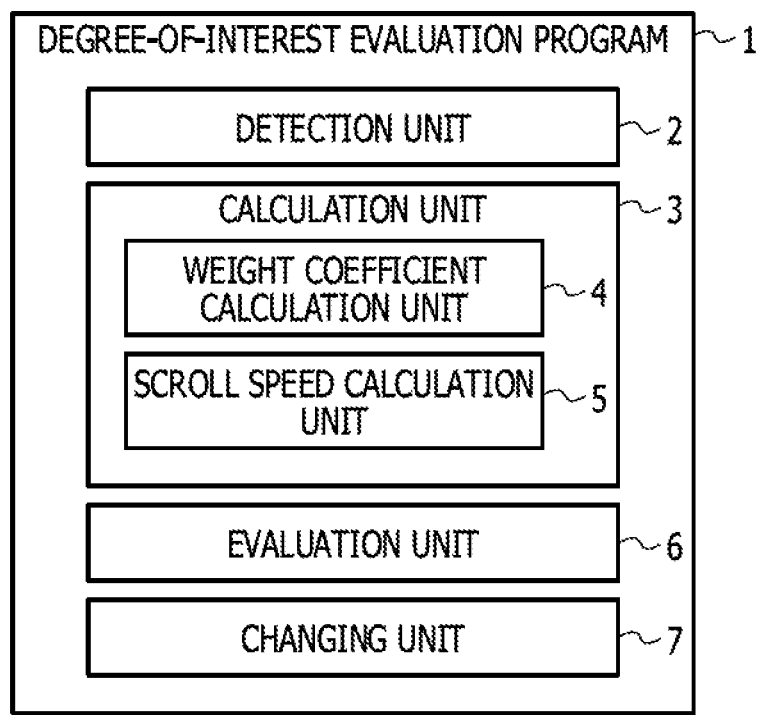
FIG. 3 is a diagram exemplifying a software configuration of the information processing device.

FIG. 3 is a block diagram for explaining the contents of processing based on the degree-of-interest evaluation program 1 able to be executed by the processors 21 and 41 in the electronic control devices 20 and 40, respectively. In a case where an execution subject of the degree-of-interest evaluation program 1 is the smartphone 10, these contents of processing are recorded, as application programs, in the storage device 12, the auxiliary storage device 23, the recording medium 17, and so forth and are deployed and performed on the memory 22. In a case of functionally classifying the contents of processing to be performed here, a detection unit 2, a calculation unit 3, an evaluation unit 6, and a changing unit 7 are installed in the degree-of-interest evaluation program 1. In addition, a weight coefficient calculation unit 4 and a scroll speed calculation unit 5 are installed in the calculation unit 3.

Figure 4A:
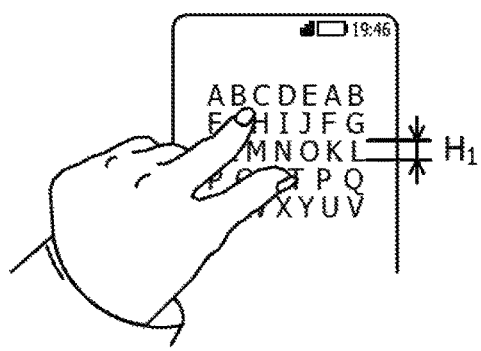
FIGS. 4A and 4B are diagrams for explaining an enlargement operation for a screen.
Figure 4B:
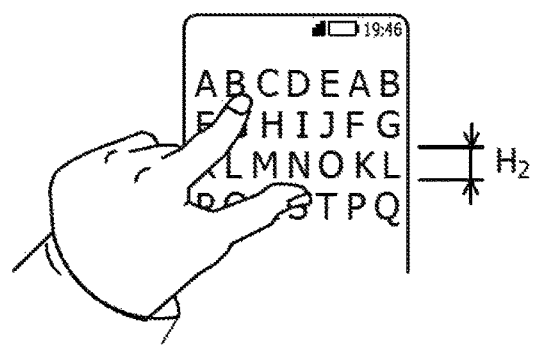

Based on an angle-of-view enlarging action performed by a user on a content displayed on a screen, the detection unit 2 detects (or calculates) the enlargement ratio E of the content. Here, the enlargement ratio E is specified based on a zoom operation on the screen or an operation for putting a face closer to the screen. The term "enlargement ratio E" here includes the enlargement ratio $E_{AB}$ of an absolute size and the enlargement ratio $E_{RE}$ of a relative size. It is assumed that a pinch-out operation is performed in a state, in which the standard size of a text is an $H_1$ pixel illustrated in, for example, FIG. 4A, and the text is enlarged to an $H_2$ pixel illustrated in FIG. 4B. At this time, based on a value obtained by dividing a changed text size by a text size before the change, the enlargement ratio $E_{AB}$ of the absolute size is specified ($E_{AB}=H_2/H_1$).

In a case where the user performs the operation for putting the face thereof closer to the screen, the enlargement ratio $E_{RE}$ of the relative size is considered. First, based on a user image image-captured by the image-capturing device 15, a viewing distance L of the user in each of the states is calculated. The viewing distance L may be calculated from the face width of the user, a distance between right and left eyeballs thereof, or a distance between right and left irises thereof. In addition, by using a detection value of an auto-focus function or proximity sensor embedded in the image-capturing device 15, a focal length of the user image may be defined as the viewing distance L.

Here, it is assumed that the viewing distance in a state illustrated in FIG. 5A is "$L_1$" and the viewing distance in a state illustrated in FIG. 5B is "$L_2$". In addition, a visual angle in a case where a content is arranged in the front of the user in the former state is defined as $2 \cdot \theta_1$, and a visual angle in the latter state is defined as $2 \cdot \theta_2$. Values of the visual angles of $2 \cdot \theta_1$ and $2 \cdot \theta_2$ are obtained from trigonometric ratios (tangents) calculated based on the viewing distances of $L_1$ and $L_2$, respectively, and a content size on the screen. At this time, as illustrated in FIG. 5C, the relative enlargement ratio $E_{RE}$ of a content for the user corresponds to the amount of change in size, based on the visual angle enlarged from $2 \cdot \theta_1$ to $2 \cdot \theta_2$, and is calculated based on a value obtained by dividing $\tan \theta_2$ by $\tan \theta_1$ ($E=\tan \theta_2 / \tan \theta_1$).

After obtaining each of the above-mentioned enlargement ratio $E_{AB}$ and enlargement ratio $E_{RE}$, the detection unit 2 of the present embodiment defines the product of these as the total enlargement ratio E (the actual enlargement ratio E obtained by combining an absolute size and a relative size). In other words, the value of the total enlargement ratio E is obtained based on $E=(H_2 \cdot \tan \theta_2)/(H_1 \cdot \tan \theta_1)$. Note that, strictly speaking, the relative enlargement ratio $E_{RE}$ is changed depending on an amount by which the content is deviated from the front of the user. Accordingly, the relative enlargement ratio $E_{RE}$ may be corrected in consideration of the face direction of the user, thereby calculating the final enlargement ratio E by using the corrected enlargement ratio $E_{RE}$. Information of the enlargement ratio E obtained here is transmitted to the calculation unit 3.

The calculation unit 3 calculates the weight coefficient W and the scroll speed Vs as parameters each having a correlation with the degree A of interest of the user in a content. The weight coefficient calculation unit 4 and the scroll speed calculation unit 5 are installed in the calculation unit 3.

Figure 6:
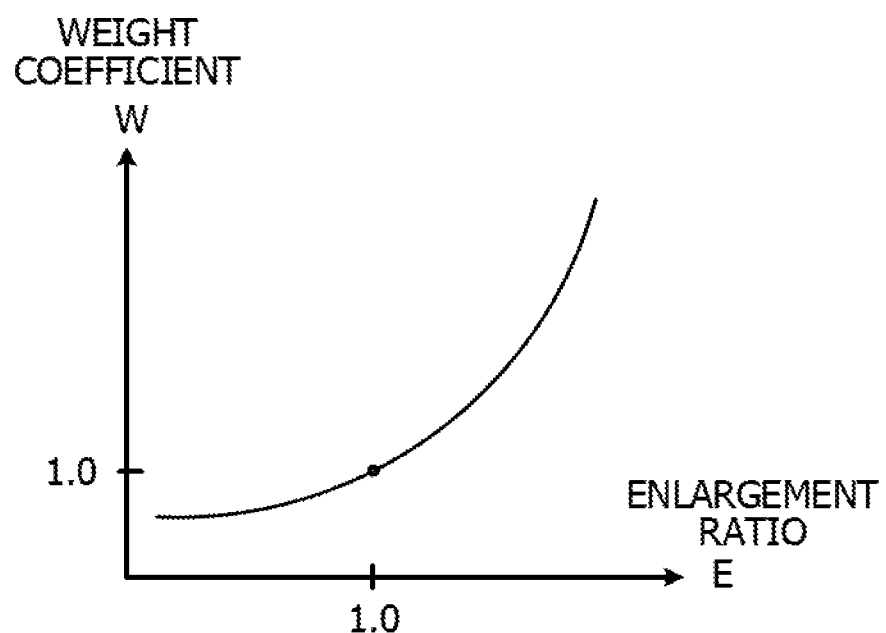
FIG. 6 is a graph exemplifying a relationship between an enlargement ratio and a weight coefficient.

In the weight coefficient calculation unit 4, the weight coefficient W is calculated based on the enlargement ratio E. The weight coefficient W is set to a value that increases with an increase in the enlargement ratio E. In this regard, however, a relationship between the enlargement ratio E and the weight coefficient W is not a linear relationship (a proportional relationship) and is set to a relationship in which the increase gradient of the weight coefficient with respect to the enlargement ratio E increases with an increase in the enlargement ratio. As illustrated in, for example, FIG. 6, a relationship between the enlargement ratio E and the weight coefficient W is defined so that a relationship in which a shape of a function graph obtained by assigning the enlargement ratio E to a horizontal axis and by assigning the weight coefficient W to a vertical axis is convex downward.

The calculation unit 3 of the present embodiment calculates the weight coefficient W by using a mathematical expression including an exponent in which the enlargement ratio E serves as a base and in which the power index r is set to a value greater than "1". The weight coefficient W is obtained based on $W=E^r$ (in this regard, however, r>1), for example. A state in which the enlargement ratio E is less than "1" corresponds to a state in which the size of a content is reduced compared with a standard size, and a state in which the enlargement ratio E is greater than "1" corresponds to a state in which the size of a content is enlarged compared with the standard size. By increasing the increase gradient of the weight coefficient W with an increase in an enlargement ratio of the content, the influence of the enlargement ratio E on the degree A of interest is enhanced.

In the scroll speed calculation unit 5, the scroll speed Vs of a content is calculated. The scroll speed Vs is a movement speed (a movement amount per unit time) of a content within a screen and is specified based on a scroll operation of the user. Note that the scroll speed Vs in a case of finishing reading a certain amount of a text content in a given period of time increases with an increase in the enlargement ratio E of the content. The reason is that a content amount (a text amount in a case of a text) displayed within one screen (or one line) decreases with an increase in the enlargement ratio E. In other words, the scroll speed Vs has a characteristic proportional to the enlargement ratio E.

Based on the weight coefficient W and the scroll speed Vs, calculated by the calculation unit 3, the evaluation unit 6 evaluates the degree A of interest of the user. Here, based on a value (W/Vs) obtained by diving the weight coefficient W by the scroll speed Vs, the degree A of interest is evaluated. As a specific method for evaluating the degree A of interest, two types of method will be exemplified.

A first method is a method for associating, with the degree A of interest without change, the index value (W/Vs) obtained by diving the weight coefficient W by the scroll speed Vs. This method is suitable in a case of intending to understand an instantaneous increase in the degree A of interest. Note that a value per unit content amount (unit time), into which the above-mentioned index value (W/Vs) is converted, may be associated with the degree A of interest.

A second method is a method for associating, with the degree A of interest, a value (a time integration value) obtained by integrating the above-mentioned index value (W/Vs). This method is suitable in a case of intending to understand the degree A of interest in an entire content.

Figure 7:
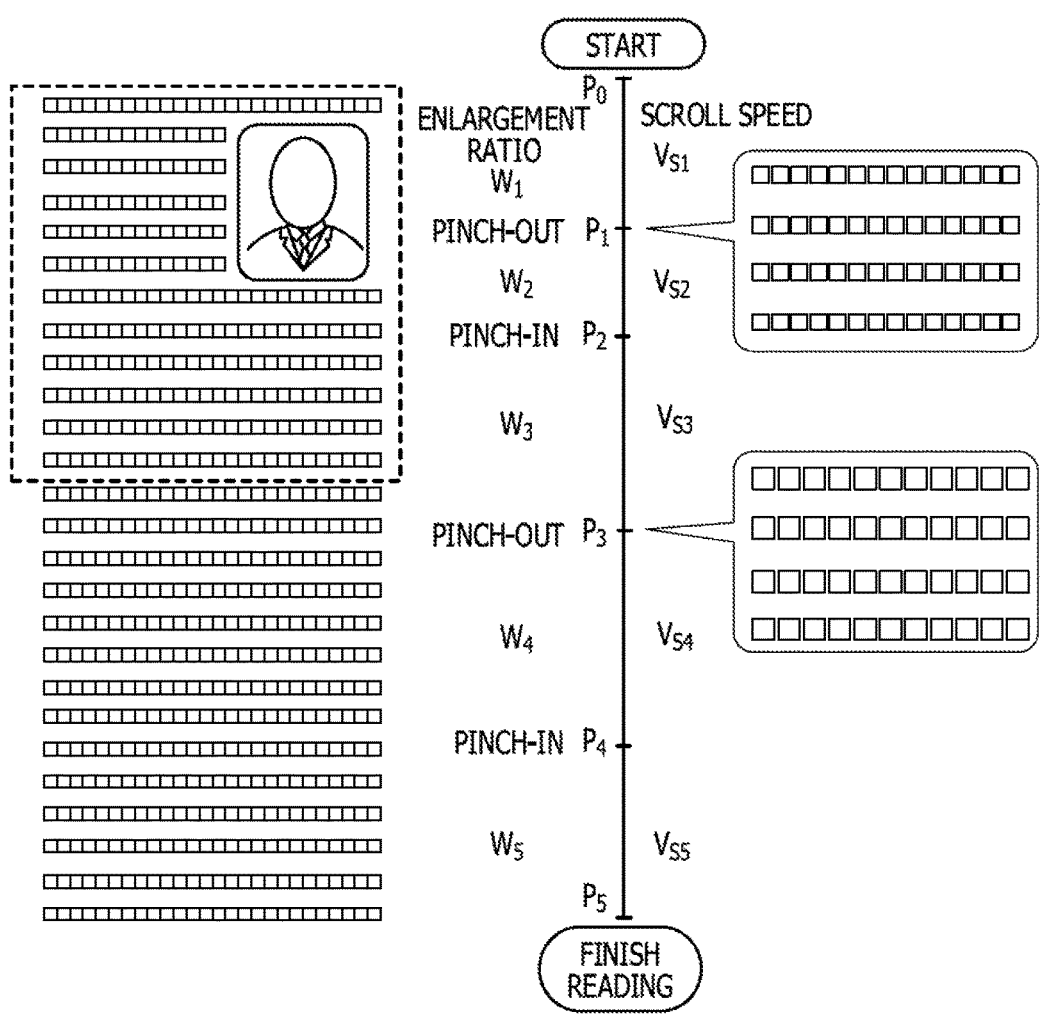
FIG. 7 is a diagram exemplifying a relationship between an enlargement operation for a content and a scroll speed.

FIG. 7 is a diagram for specifically explaining the second method. A dashed line within the drawing indicates the size of an area displayed within one screen in a case where a character size of an article (a content) within a Web page is the standard size. As long as no zoom operation is performed, this dashed-line frame turns out to be subjected to slide movement downward by the scroll operation of the user. On the other hand, in a case the zoom operation is performed, the content is enlarged, and the dashed-line frame is relatively reduced in size.

Symbols P each indicate a position within the content. In addition, it is assumed that the uppermost portion of the content is $P_0$ and the lowermost portion thereof is $P_5$. Positions $P_1$ and $P_3$ each correspond to a position at which the user performs an enlargement operation on the content, and positions $P_2$ and $P_4$ each correspond to a position at which the user performs a reduction operation on the content. In addition, the scroll speed Vs obtained by calculating an average value within each of intervals separated by these positions is exemplified. As illustrated in Expression 1, the degree A of interest in the entire content is obtained by the linear sum of index values obtained by dividing, by the scroll speed Vs, the weight coefficient W in each of the intervals.

$$A = \sum_i \left( \frac{W_i}{Vs_i} \right) = \frac{W_1}{Vs_1} + \frac{W_2}{Vs_2} + \frac{W_3}{Vs_3} + \frac{W_4}{Vs_4} + \frac{W_5}{Vs_5} \qquad \text{Math. 1}$$

Widths of intervals in which the respective index values (W/Vs) are calculated are not limited to the intervals separated by the positions $P_1$, $P_2$ ... or the like. In other words, the index value (W/Vs) per unit time may be calculated from the scroll speed Vs (an instantaneous value) momentarily varying and a weight coefficient at that point of time, and an integration value of the value thereof may be defined as the degree A of interest. Alternatively, the average scroll speed Vs and the average weight coefficient may be calculated for each predetermined time period (for example, for every 30 seconds), and, by using these, the index value (W/Vs) may be calculated for each predetermined time period, thereby defining an integration value of the value thereof as the degree A of interest.

Figure 8:
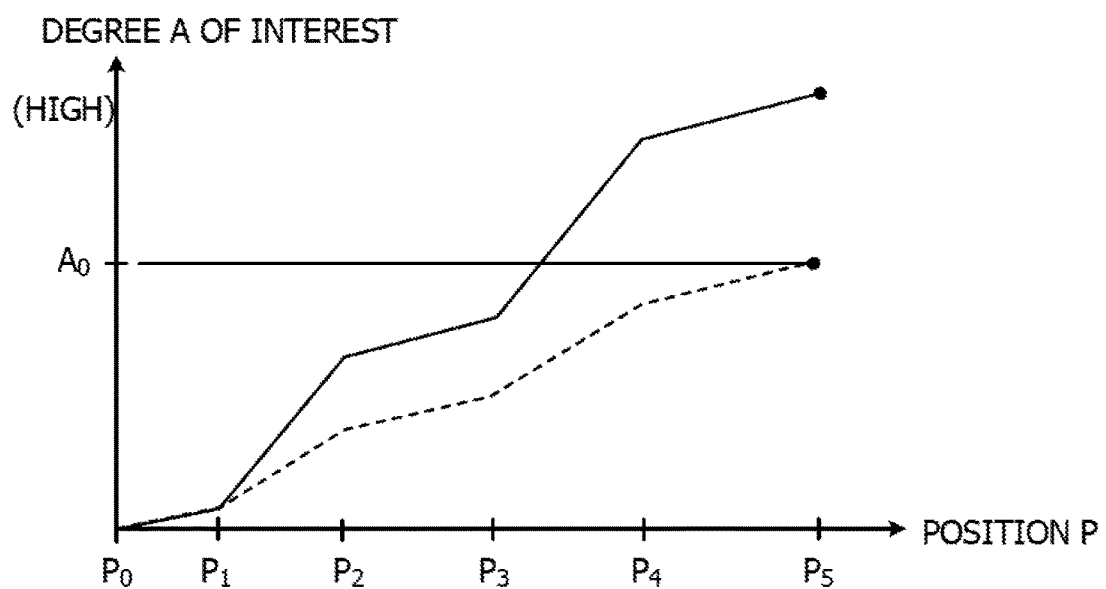
FIG. 8 is a graph exemplifying a relationship between a position on a content and the degree of interest.

FIG. 8 is a graph exemplifying a relationship between a position within a content and the degree A of interest. A solid line graph corresponds to a graph obtained by evaluating, based on the weight coefficient W and the scroll speed Vs, the degree A of interest, and a dashed line graph corresponds to a graph in which only the scroll speed Vs is caused to be reflected in the degree A of interest (a graph in which the weight coefficient W is not considered). In the present embodiment, the weight coefficient W is set so as to have such a characteristic as illustrated in FIG. 4, and the influence of the enlargement ratio E on the degree of interest is made stronger than the influence of the scroll speed Vs on the degree of interest. For this reason, as illustrated between $P_1$ and $P_2$ or between $P_3$ and $P_4$, it becomes easier for the degree A of interest within a time period in which the content is enlarged to be increased. In other words, by observing the climb gradient of the degree A of interest, it becomes easy to distinguish between a point at which further reading with interest is performed and a point at which reading is performed otherwise, and the resolution of the degree A of interest (the position resolution or temporal resolution thereof within the content) is improved.

Note that if the weight coefficient W is not considered, a time period that elapses before the degree A of interest reaches a predetermined threshold value $A_0$ is likely to be increased. As illustrated in, for example, FIG. 8, in a case where a time period sufficient for a user to read through the content does not elapse, it is difficult to determine whether or not the degree A of interest reaches the threshold value $A_0$. To put it the other way around, the threshold value $A_0$ has to be set to the extent that the degree A of interest may be increased within a time period sufficient for the user to finish reading the content. On the other hand, in the present embodiment, the climb gradient of the degree A of interest in an area in which the enlargement ratio E is large is made high. Accordingly, it becomes possible to determine that the degree A of interest reaches the threshold value $A_0$ in a short amount of time, compared with the related art.

In accordance with the degree A of interest evaluated by the evaluation unit 6, the changing unit 7 changes what a content indicates or the display form thereof. Here, based on the degrees A of interest, selection of sorting (rearrangement), display, or non-display of contents is implemented. Alternatively, control for dynamically changing, in response to the degree A of interest, the content of an advertisement column displayed outside the field of a content is implemented. The content of a point that indicates the highest degree A of interest within an article is analyzed, and an advertisement suitable for the content thereof is presented, for example.

4. Flowchart

Figure 9:
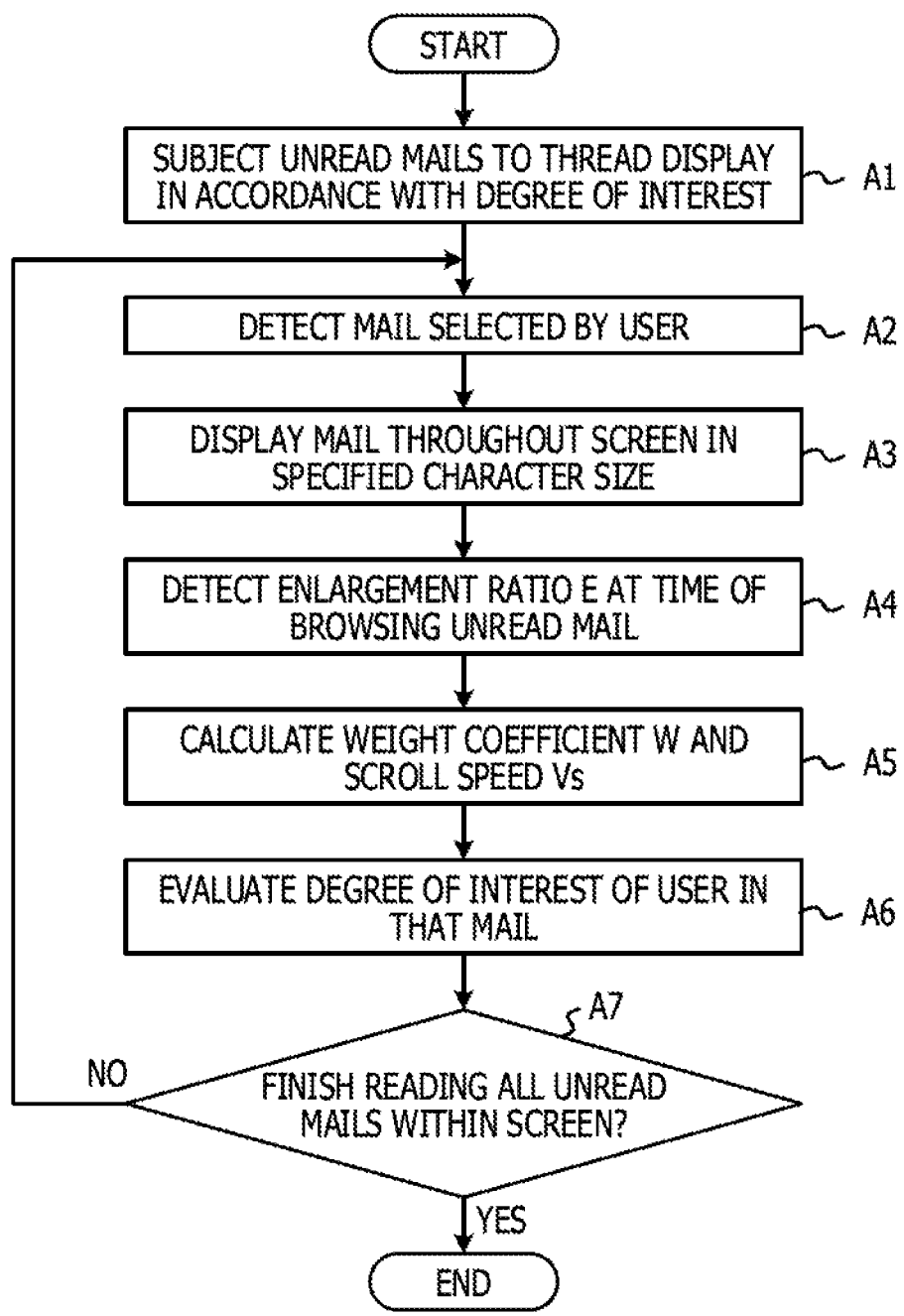
FIG. 9 is an example of a flowchart illustrating a procedure for evaluating the degree of interest in a mail.

FIG. 9 is an example of a flowchart in a case where contents to serve as evaluation targets of the degree A of interest are electronic mails and sorting (rearrangement) of mails displayed on a mailer is implemented in response to the degree A of interest. In mailers, there is a mailer equipped with a function of classifying and displaying mails, based not only on transmission or reception time of individual mails but also on the degree of association between contents (a relationship between reply mails and replied mails) or sender names. As one item for such classification, the degrees of importance of individual mails may be adopted.

Alternatively, in a mailer equipped with a thread display function based on the degree of association between contents, mails each having the high degree of importance and mails associated therewith may be subjected to thread display. Since a newly received mail is not read by a user thereof yet, the degree A of interest thereof is not evaluated yet. On the other hand, in a case where the thread display function (in other words, a function of analyzing a relationship between mails) is used, the degree A of interest in each of unread mails is able to be estimated in advance. Therefore, it becomes possible to quickly provide unread mails in which the user is expected to be interested.

At a time of, for example, causing unread mails to be displayed on a list screen on a screen immediately after activation of a mailer, the average degree of interest in previous mails (mails within the same thread) each having the high degree of association between contents, and unread mails having the high average degree of interest are subjected to thread display (step A1). In other words, among the unread mails, mails associated with a mail in which the user previously exhibited a keen interest are displayed on an upper level on a priority basis. Association with previous mails may be determined based on mail header information or a keyword correlation obtained from text analysis of a mail text.

Subsequently, a mail selected by the user is detected (step A2), and the selected mail is displayed in a specified character size (step A3). While browsing the mail, the enlargement ratio E is detected based on the angle-of-view enlarging action of the user (step A4). At this time, in consideration not only of the enlargement ratio $E_{AB}$ of an absolute size, based on the zoom operation for a screen, but also of the enlargement ratio $E_{RE}$ of a relative size, based on an operation for decreasing a viewing distance, the total enlargement ratio E is obtained. In addition, the weight coefficient W is calculated based on the enlargement ratio E, and the scroll speed Vs at a time of browsing is calculated (step A5).

In a case where the user finishes reading the mail, the degree A of interest in that mail is evaluated based on the weight coefficient W and the scroll speed Vs (step A6). At this time, the degree A of interest in a mail through which the user skims (a mail to which a once-over is given) is decreased, and the degree A of interest in a closely and carefully read mail is increased. In particular, the degree A of interest in a mail browsed in a state in which characters are enlarged is relatively highly evaluated. In a case where such processing operations are repeatedly performed on all unread mails and the user finishes reading all the unread mails (step A7), the evaluation of the degree A of interest finishes. Information of the degree A of interest, obtained here, turns out to be reflected in the content of display of a list of subsequent unread mails.

Figure 10:
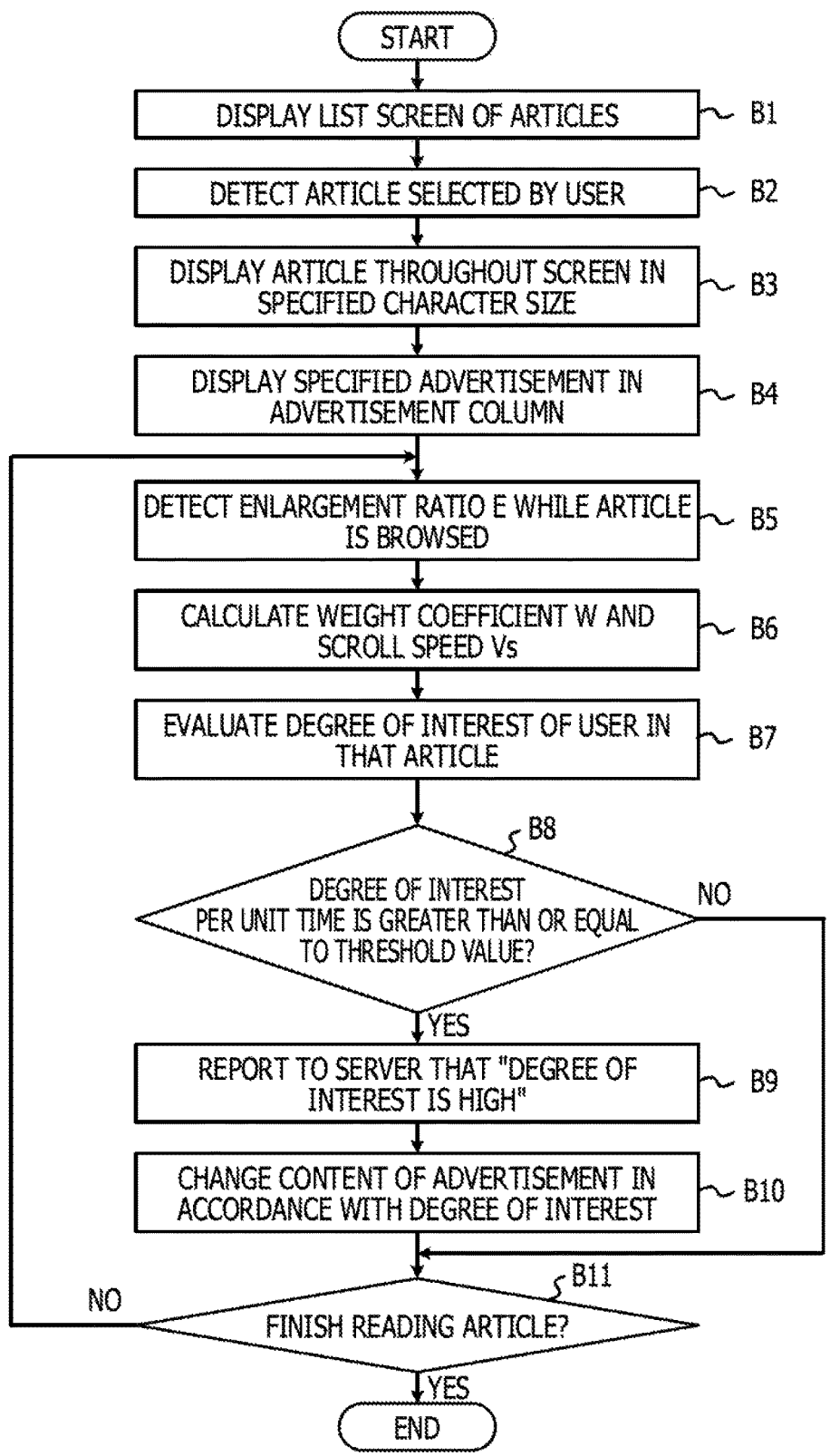
FIG. 10 is an example of a flowchart illustrating a procedure for evaluating the degree of interest in an article.

FIG. 10 is an example of a flowchart in a case where contents to serve as evaluation targets of the degree A of interest are articles within Web pages and the content of an advertisement displayed on a screen is changed in response to the degree A of interest. Advertisements to serve as change targets include not only advertisements (banner advertisements) on Web screens but also advertisements (overlay advertisements) subjected to floating display in upper portions of screens and lower portions thereof. The contents of advertisements are initially set to specified contents (for example, contents for everyone). In addition, an increase or decrease in the degree A of interest in an article is evaluated while a user browses the article, and that is continually reflected in the content of an advertisement.

In, for example, a browser screen that displays Web pages, articles are displayed on a list screen (step B1), an article selected by the user is detected (step B2), and the selected article is displayed in a specified character size (step B3). In addition, a specified advertisement is displayed in an advertisement column (step B4). While the article is browsed, the enlargement ratio E is detected based on the angle-of-view enlarging action of the user (step B5). At this time, in consideration not only of the enlargement ratio $E_{AB}$ of an absolute size, based on the zoom operation for a screen, but also of the enlargement ratio $E_{RE}$ of a relative size, based on an operation for decreasing a viewing distance, the total enlargement ratio E is obtained. In addition, the weight coefficient W is calculated based on the enlargement ratio E, and the scroll speed Vs at a time of browsing is calculated (step B6).

The degree A of interest of the user in that article is continually evaluated while the user browses the article (step B7). At this time, in a process of reading further in the article, the value of the degree A of interest is gradually increased. In addition, the degree A of interest in an article through which the user skims (an article to which a once-over is given) is decreased, and the degree A of interest in a closely and carefully read article is increased. In particular, it becomes easier for the degree A of interest during enlargement of an article to be increased. After that, in a case where the degree A of interest per unit time (the average degree of interest) exceeds a threshold value (step B8), it is reported to a server that the user is intensely interested in that article (step B9), and the content of an advertisement is changed to that corresponding to the degree A of interest (step B10). In addition, in a case where the degree A of interest per unit time does not exceed the threshold value, the processing proceeds to step B11.

Note that, the determination in step B8 may be performed by using the integration value of the degree A of interest in place of the degree A of interest per unit time. The content of an advertisement may correspond to the content of an entire article or may correspond to information of a position within a content browsed by the user (a content at a point read by the user) at a time when the condition of step B8 is satisfied. The processing operations in step B5 and subsequent thereto are repeated until the user finishes reading the article, and in a case where the user finishes reading the article (step B11), the calculation of the degree A of interest is terminated. Information of the degree A of interest, obtained here, may be reflected in the content of display of subsequent advertisements or may be utilized as marketing information for a content provider.

5. Advantages (1) In the present embodiment, a relationship between the three of the degree A of interest, the enlargement ratio E, and the scroll speed Vs is set so that the influence of the enlargement ratio E on the degree of interest becomes stronger than the influence of the scroll speed Vs on the degree of interest. A relationship of the weight coefficient W with the enlargement ratio E is set to a relationship of a "graph convex downward", for example. For this reason, it is possible to avoid the normalization of the degree A of interest with respect to the scroll speed Vs, and it is possible to quantify and understand the degree A of interest of a user in a content with accuracy. Accordingly, it is possible to improve the evaluation accuracy of the degree A of interest.

In addition, the influence of an increase in the scroll speed Vs, caused by enlarging a content, becomes reduced. Accordingly, it becomes easy to distinguish between a point at which the degree A of interest is increased and a point at which the degree A of interest is not increased, and it is possible to improve the temporal resolution of the degree A of interest. In addition, compared with the related art, it is possible to swiftly understand that the degree A of interest of the user is high. Furthermore, by detecting, based on an operation of the user, the degree A of interest, it is possible to simply and non-invasively understand the degree A of interest while not imposing a psychological load on the user.

(2) In the present embodiment, a relationship between the enlargement ratio E and the weight coefficient W is set so that the increase gradient of the weight coefficient W with respect to the enlargement ratio E is increased with an increase in the enlargement ratio E. It is possible to increase the climb gradient of the degree A of interest with an increase in the enlargement ratio E, and it is possible to improve the evaluation accuracy of the degree A of interest. In addition, it is possible to reliably enhance the influence of the enlargement ratio E on the degree A of interest, compared with the influence of the scroll speed Vs on the degree A of interest, and it is possible to swiftly understand the degree A of interest with accuracy.

(3) In the present embodiment, the weight coefficient W is given as a function including an exponent in which the enlargement ratio E serves as a base. For this reason, it is possible to reliably enhance the influence of the enlargement ratio E on the degree A of interest, compared with the influence of the scroll speed Vs on the degree A of interest, and it is possible to swiftly understand the degree A of interest with accuracy. In addition, a relationship between the enlargement ratio E and the weight coefficient W is expressed by a relatively simple function. Therefore, there is an advantage that it is possible to simplify a computing configuration.

(4) In the present embodiment, in accordance with the degree A of interest, what a content indicates or the display form thereof is changed. For this reason, it is possible to provide contents in which what the contents indicate and the forms thereof are suitable for preferences of the user, and it is possible to enhance the utility values of contents for the user (experienced values or user experience). In addition, as illustrated in, for example, FIG. 9, control for evaluating the degrees A of interest in unread mails before the user reads mails and displaying, on an upper level on a priority basis, mails each having the high degree of importance becomes available. For this reason, it is possible for the user to read further in an order starting from an important mail within a limited amount of time, and it is possible to improve the browsing efficiency of mails or an operational efficiency. On the other hand, as illustrated in, for example, FIG. 10, the content of an advertisement is changed in accordance with the degree of interest of the user. Accordingly, it is possible to provide advertisements consistent with preferences or expectations of the user, and it is possible to improve convenience.

(5) In a case where, as illustrated in FIG. 8, based on the integration value of a value (W/Vs) obtained by diving the weight coefficient W by the scroll speed Vs, the degree A of interest is evaluated, it is possible to swiftly calculate the highly accurate degree A of interest. In, for example, a stage earlier than the user finishes reading a content, it is possible to understand that the degree A of interest of the user is high. In addition, it is possible to easily understand not only a point at which the degree A of interest is increased but also the degree of increase in the degree A of interest in an entire content.

(6) In the present embodiment, by using the enlargement ratio $E_{AB}$ of an absolute size, calculated based on a zoom operation for a content, the enlargement ratio E is obtained. For this reason, it is possible to understand a fluctuation of the enlargement ratio $E_{AB}$ of an absolute size with accuracy, and it is possible to improve the calculation accuracy of the weight coefficient W.

(7) On the other hand, in the present embodiment, in consideration not only of the zoom operation but also of the enlargement ratio $E_{RE}$ of a relative size, calculated based on an operation for decreasing a viewing distance, the enlargement ratio E is obtained. For this reason, it is possible to understand a fluctuation of the enlargement ratio $E_{RE}$ of a relative size with accuracy, and it is possible to further improve the calculation accuracy of the weight coefficient W.

6. Example of Modification while, in the above-mentioned embodiment, two types of method for evaluating the degree A of interest are described, a specific method for evaluating the degree A of interest is not limited to these. Based on, for example, a differential value of the index value (W/Vs) obtained by dividing the weight coefficient W by the scroll speed Vs, the degree A of interest may be evaluated. Alternatively, by using a combination of the index value (W/Vs), the differential value thereof, and an integration value thereof, the degree A of interest may be evaluated. By using at least the weight coefficient W and the scroll speed Vs, the degree A of interest is evaluated, thereby achieving the same advantages as those of the above-mentioned embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and the processor configured to:
  detect an enlargement ratio of a content displayed on a screen based on an angle-of-view enlarging action performed on the content;
  calculate a weight coefficient corresponding to the detected enlargement ratio using a function graph obtained by assigning the enlargement ratio to a horizontal axis and the weight coefficient to a vertical axis and having a convex shape downward;
  calculate a scroll speed of the content;
  evaluate a degree of interest corresponding to the content based on the weight coefficient and the scroll speed; and
  perform a display processing for the screen in accordance with display configuration determined based on the evaluated degree of interest,
wherein the degree of interest is evaluated based on an integration value of a value obtained by dividing the weight coefficient by the scroll speed,
wherein the weight coefficient is calculated based on function including an exponent with the enlargement ratio as a base.

2. The information processing device according to claim 1, wherein the degree of interest becomes higher as the enlargement ratio increases; and the degree of interest becomes lower as the scroll speed increases.

3. The information processing device according to claim 2, wherein an absolute value of increase gradient according to the enlargement ratio is larger than an absolute value of increase gradient according to the scroll speed.

4. The information processing device according to claim 1, wherein the display configuration includes what the content indicates or a display form thereof, determined in accordance with the degree of interest.

5. The information processing device according to claim 1, wherein the enlargement ratio is detected based on a zoom operation for the content.

6. The information processing device according to claim 1, wherein the enlargement ratio is detected based on a viewing distance of the user.

7. An interest evaluation method executed by a computer, the interest evaluation method comprising:
  detecting an enlargement ratio of a content displayed on a screen based on an angle-of-view enlarging action performed on the content;
  calculating a weight coefficient corresponding to the detected enlargement ratio using a function graph obtained by assigning the enlargement ratio to a horizontal axis and the weight coefficient to a vertical axis and having a convex shape downward;
  calculating a scroll speed of the content;
  evaluating a degree of interest corresponding to the content based on the weight coefficient and the scroll speed; and
  performing a display processing for the screen in accordance with display configuration determined based on the evaluated degree of interest,
wherein the degree of interest is evaluated based on an integration value of a value obtained by dividing the weight coefficient by the scroll speed,
wherein the weight coefficient is calculated based on function including an exponent with the enlargement ratio as a base.

8. A non-transitory computer-readable storage medium storing an interest evaluation program that causes a computer to execute a process, the process comprising:
  detecting an enlargement ratio of a content displayed on a screen based on an angle-of-view enlarging action performed on the content;
  calculating a weight coefficient corresponding to the detected enlargement ratio using a function graph obtained by assigning the enlargement ratio to a horizontal axis and the weight coefficient to a vertical axis and having a convex shape downward;
  calculating a scroll speed of the content;
  evaluating a degree of interest corresponding to the content based on the weight coefficient and the scroll speed; and
  performing a display processing for the screen in accordance with display configuration determined based on the evaluated degree of interest,
wherein the degree of interest is evaluated based on an integration value of a value obtained by dividing the weight coefficient by the scroll speed,
wherein the weight coefficient is calculated based on function including an exponent with the enlargement ratio as a base.

9. The interest evaluation method according to claim 7, wherein the degree of interest becomes higher as the enlargement ratio increases; and the degree of interest becomes lower as the scroll speed increases.

10. The interest evaluation method according to claim 9, wherein an absolute value of increase gradient according to the enlargement ratio is larger than an absolute value of increase gradient according to the scroll speed.

11. The interest evaluation method according to claim 7, wherein the display configuration includes what the content indicates or a display form thereof, determined in accordance with the degree of interest.

12. The non-transitory computer-readable storage medium according to claim 8, wherein the degree of interest becomes higher as the enlargement ratio increases; and the degree of interest becomes lower as the scroll speed increases.

13. The non-transitory computer-readable storage medium according to claim 12, wherein an absolute value of increase gradient according to the enlargement ratio is larger than an absolute value of increase gradient according to the scroll speed.

14. The non-transitory computer-readable storage medium according to claim 8, wherein the display configuration includes what the content indicates or a display form thereof, determined in accordance with the degree of interest.

* * * * *